United States Patent [19]

Lindenmeier et al.

[11] Patent Number: 5,313,660

[45] Date of Patent: May 17, 1994

[54] ANTENNA DIVERSITY SYSTEM WITH AT LEAST TWO ANTENNAE FOR THE MOBILE RECEPTION OF VERY-HIGH AND ULTRA-HIGH FREQUENCY WAVES

[75] Inventors: Heinz Lindenmeier, Planegg; Jochen Hopf, Haar; Leopold Reiter, Gilching; Rainer Kronberger, Ottobrunn, all of Fed. Rep. of Germany

[73] Assignee: Fuba Hans Kolbe & Co., Hildesheim, Fed. Rep. of Germany

[21] Appl. No.: 859,712

[22] PCT Filed: Jan. 20, 1992

[86] PCT No.: PCT/EP92/00104

§ 371 Date: Jun. 8, 1992

§ 102(e) Date: Jun. 8, 1992

[87] PCT Pub. No.: WO89/11185

PCT Pub. Date: Nov. 16, 1989

[30] Foreign Application Priority Data

Jan. 21, 1991 [DE] Fed. Rep. of Germany ....... 4101629

[51] Int. Cl.⁵ .............................................. H04N 5/00
[52] U.S. Cl. .................... 455/135; 455/277.2; 348/729
[58] Field of Search ............... 455/134, 277.1, 277.2, 455/135; 358/188; H04N 5/00

[56] References Cited

U.S. PATENT DOCUMENTS 4,733,402  3/1988  Monsen ............................ 455/134
5,159,707 10/1992  Mogi et al. ..................... 455/277.2

FOREIGN PATENT DOCUMENTS

0350007  1/1990  European Pat. Off. .
2121650 12/1983  Fed. Rep. of Germany .
3517247 11/1986  Fed. Rep. of Germany .
3926336  2/1991  Fed. Rep. of Germany .
8911185 11/1989  PCT Int'l Appl. .

*Primary Examiner*—Mark R. Powell
*Attorney, Agent, or Firm*—Michael J. Striker

[57] ABSTRACT

The antenna diversity system for mobile reception of VHF and UHF waves has a plurality of antennae; an antenna distributor connected to each of the antennae to receive antenna signals from the antennae and having a plurality of inputs and sets of outputs; a plurality of antenna switches, each of the antenna switches being connected to one of the sets of outputs of the antenna distributor; a plurality of tuners, each of the tuners connected to one of the antenna switches and producing one of an intermediate-frequency signal and demodulated signal; a plurality of diversity processors, each of the diversity processors being connected to a tuner to receive an intermediate-frequency or demodulated signal therefrom and also to the antenna switch of the tuner connected thereto via a control line and being structured to carry out a signal evaluation of the signal received in the diversity processor to control the antenna switch to switch through a more favorable input signal to the tuner connected to it.

20 Claims, 6 Drawing Sheets

ANTENNA DIVERSITY SYSTEM WITH AT LEAST TWO ANTENNAE FOR THE MOBILE RECEPTION OF VERY-HIGH AND ULTRA-HIGH FREQUENCY WAVES

BACKGROUND OF THE INVENTION

The invention relates to an antenna diversity system having at least two antennae for the mobile reception of very-high and ultra-high frequencies [hereinafter: VHF and UHF].

An antenna diversity system with at least two antennae is known having an antenna switch and a tuner to which a selected RF signal is supplied by the antenna switch, the tuner having an output which guides the intermediate-frequency signal or the demodulated signal and is connected with a diversity processor in which a signal evaluation is carried out, the results of which determine whether or not the antenna switch is made to switch through a more favorable input signal to its output via a control line leading from the diversity processor to the antenna switch.

Multipath propagation in mobile radio and television reception causes considerable reception interference. In the case of radio reception this interference greatly impairs listening pleasure due to noise and pronounced distortions of the low-frequency signal and in the case of television reception causes visual disturbance in ghost images, fluttering of the picture, color fading, and loss of synchronization and picture. Such reception interference considerably impairs the reception quality and must therefore be prevented.

An antenna diversity system for eliminating reception interference in frequency-modulated ultrashort-wave radio is known from the German Patent Application P 35 17 247. In this case, at least two antenna signals are supplied to a diversity processor containing a frequency deviation threshold and an amplitude threshold with which the frequency disturbance deviation pulse currently caused by interference and the interference-induced amplitude break-ins in the intermediate frequency signal supplied to the diversity processor from the receiver are compared. If the disturbances exceed the thresholds, a switching process is initiated such that another antenna signal or another linear combination derived from the antenna signals is supplied to the tuner with intermediate-frequency component.

An antenna diversity system for preventing picture interference in the mobile reception of television signals in the VHF and UHF band is described in the German Patent Application P 39 26 336.3. This antenna diversity system has a diversity processor with N antenna signal inputs and a television receiver. The video signal and the horizontal and vertical synchronizing signals are supplied to the diversity processor. The diversity processor contains a time gate which is opened by the horizontal synchronizing pulses during the horizontal blanking time so that the video signal is switched through for evaluating the signal quality. An address signal is generated via a control circuit during incipient picture interference in such a way that a new antenna signal or another linear combination derived from the antenna signals is supplied to the television receiver via an antenna combiner.

Each of the diversity systems described in the patent application mentioned above solves the problem of reducing reception interference in a radio or television channel caused by multipath propagation. But to improve the television sound in a vehicle in addition to the television picture, separate antennae and accordingly also separate antenna diversity systems are required for television reception as well as sound reception in the prior art. The use of the solution indicated in P 39 26 336.3 prevents the picture interference in mobile reception, but not the sound interference of the respective television sound. On the one hand, this is because the television picture is amplitude-modulated in a special manner, while the television sound is frequency-modulated and the criteria for determining the picture quality are completely different in principle than the criteria for determining sound interference. On the other hand, the frequency separation of 5.5 MHz between the picture and sound carriers causes the reception ratios at the location of a reception antenna for picture and sound carriers to be completely different with such a large frequency separation. As a result, e.g., the picture interference can be at a maximum and the sound carrier interference at a minimum simultaneously.

This means that at least four antennae must be arranged on the vehicle when using the aforementioned solutions according to the prior art. But to obtain a distinct improvement in reception a quantity of four antennae per diversity arrangement is recommended in the literature on the subject. This already results in eight antennae which must be mounted on the vehicle according to the prior art to efficiently eliminate picture and sound interference while traveling. Consequently, at least 12 antenna would have to be arranged on the vehicle in order for the stereo television sound transmitted in two bands separated by a gap in frequency to be improved by antenna diversity. Further, considering the enormous frequency band width of approximately 40 to 860 MHz which must be covered, the difficulty of covering this large frequency band with a single antenna presents an additional problem so that the required number of antennae is further increased by the use of band antennae. But it is not possible to accommodate such a large number of antennae on modern motor vehicles.

SUMMARY OF THE INVENTION

The present invention therefore has the object of providing an antenna diversity system for the mobile reception of VHF and UHF waves which makes it possible to use one and the same set of antennae for supplying two or more tuners having different reception requirements without an excessive number of antennae and to ensure the adjustment of diversity reception ratios favorable for each tuner.

According to the invention, the antenna diversity system for mobile reception of VHF and UHF waves comprises a plurality of antennae; an antenna distributor connected to each of the antennae to receive antenna signals from the antennae and having a plurality of sets of outputs; a plurality of antenna switches, each of the antenna switches being connected to one of the sets of outputs of the antenna distributor; a plurality of tuners, each of the tuners being connected to one of the antenna switches and producing one of an intermediate-frequency signal and a demodulated signal; a plurality of diversity processors, each of the diversity processors being connected to a tuner to receive the intermediate-frequency or demodulated signal therefrom and also to the antenna switch of the tuner connected thereto via a control line and being structured to carry out a signal evaluation of the signal received in the diversity processor to control the antenna switch so that the antenna switch switches through a more favorable input signal to the tuner connected thereto.

Such antenna diversity systems are preferably used to improve the television and sound reception in the VHF and UHF band in motor vehicles.

The advantages which can be achieved by the invention consist in the considerable reduction in the number of antennae for antenna diversity systems whose tuners are used for completely different reception requirements. Thus, in a construction according to the invention, a set of e.g., four antennae is sufficient for suppressing the reception interference of stereo television sound and television pictures as well as the reception interference in the ultrashort-wave radio. Accordingly, the possibility of operating a plurality of diversity devices simultaneously in a motor vehicle is provided for the first time. Clearly, with the current compact construction of motor vehicles it would no longer be possible to accommodate a large number of antennae on or at the vehicle, even apart from the difficulty of arranging cables and the enormous cost. In the case of television picture and sound reception, the antenna diversity system according to the invention has the additional advantage that e.g., the oscillator of the picture tuner can also be used for the sound tuner because of the compact construction, so that additional costs can be saved.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
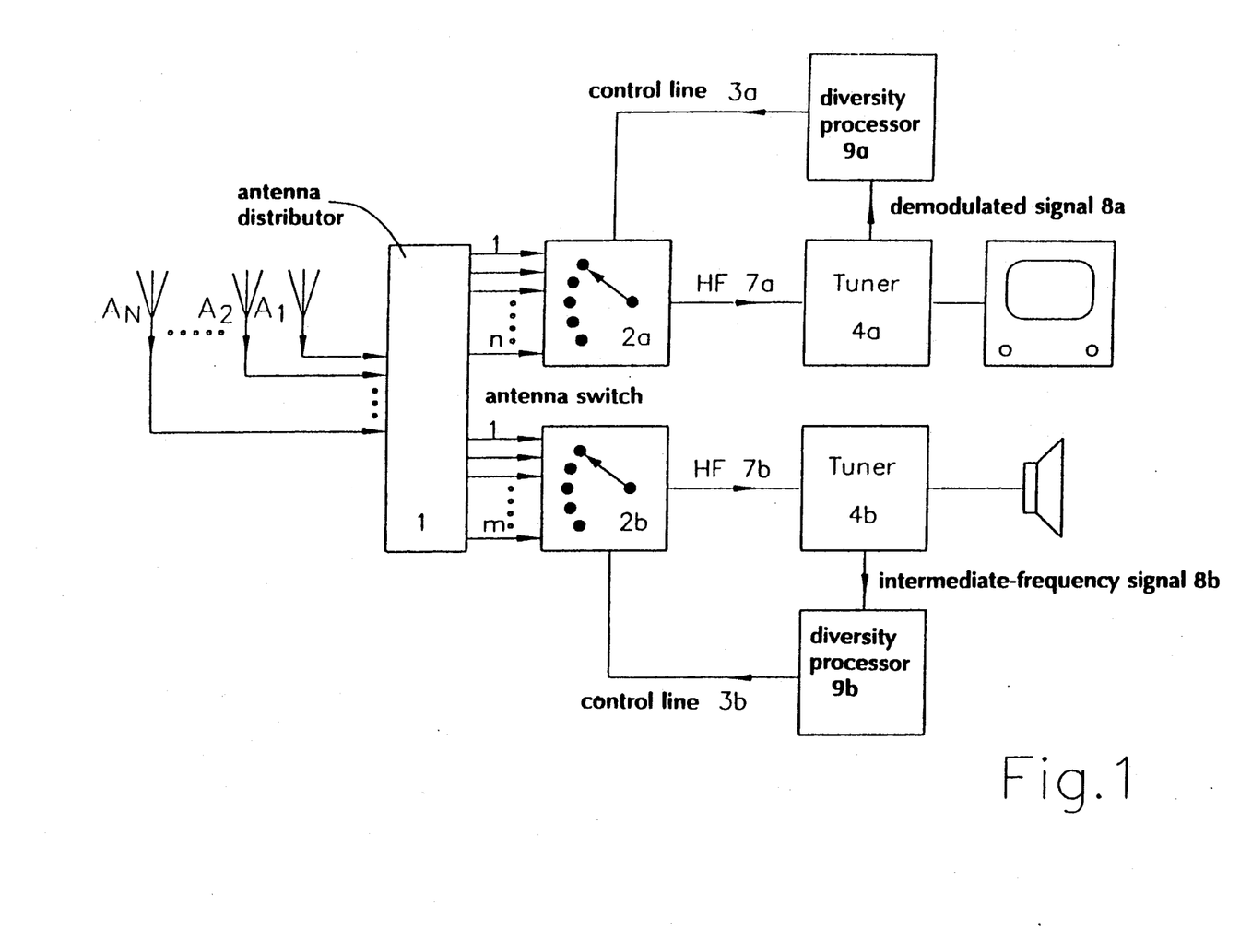
FIG. 1 shows an antenna diversity system according to the invention having an antenna distributor, two antenna switches, two tuners and two diversity processors.

FIG. 1 shows an antenna diversity system according to the invention. It has a set of N antennae $A_1$ to $A_N$ which are connected to the inputs of the antenna distributor 1. The outputs of the antenna distributor supply the antenna signals and are connected to the two antenna switches 2a and 2b. An output signal of the antenna distributor 1 is selected in the antenna switches by a control line 3a and 3b and switched through to the tuner 4a and 4b. The tuner 4a can be, e.g., a television picture tuner, as shown in FIG. 1. The RF signal 7a is converted to an intermediate frequency and demodulated in the tuner 4a so that its video signal and possibly other signals can be supplied to a 9a demodulated signal 8a. The current picture quality is compared with a threshold in the diversity processor in the horizontal blanking time in a known manner, e.g. via a time gate (see P 39 26 336), and if necessary the control line 3a is set in such a way that the antenna switch 2a is made to switch to another output signal of the antenna distributor 1. In this way it is ensured that the available HF signal having the best picture quality is always switched through to the tuner 4a.

The tuner 4b in FIG. 1 is tuned to the television sound of the same television channel. The frequency-modulated, intermediate-frequency signal which is not yet limited is fed to the diversity processor 9b. The interference-induced frequency interference deviation peaks and the amplitude break-ins are compared with thresholds in the diversity processor in a known manner (see P 35 17 247). During sound interference the antenna switch 2b is caused to switch through a better television sound signal to the tuner 4b via the control line 3b. Such an antenna diversity system ensures that the television picture as well as the respective television sound have the least interference at any point in time independently of one another in that the respective tuner can access all other available antenna signals independently of the other tuners.

Figure 6:
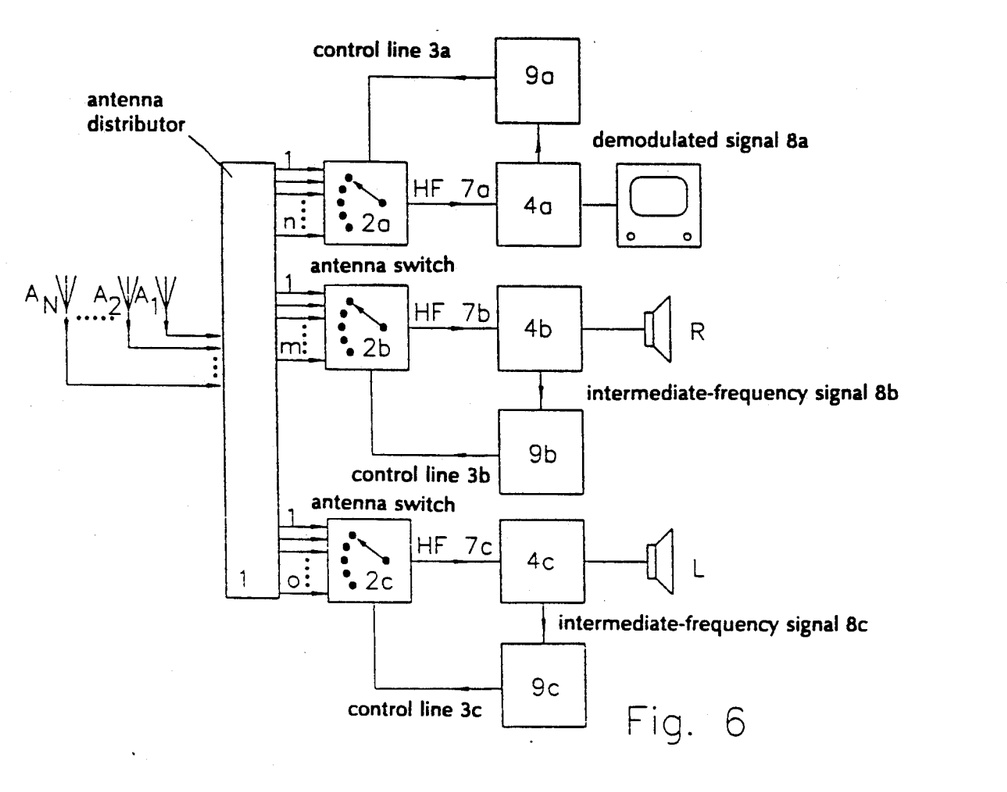
FIG. 6 shows an antenna diversity system for preventing reception interference in the reception of stereo television sound and the television picture.

Due to the introduction of stereo sound or two-channel sound in television whose sound carriers have a separation of 242 kHz, another tuner 4c is required (see FIG. 6) because in this frequency separation, which is greater than the channel separation in ultrashort-wave radio, the reception signals already have a clearly different configuration over time at the location of the antennae, as is shown by measurements. The sound interference is also eliminated for the second sound channel according to the described method.

Figure 7:
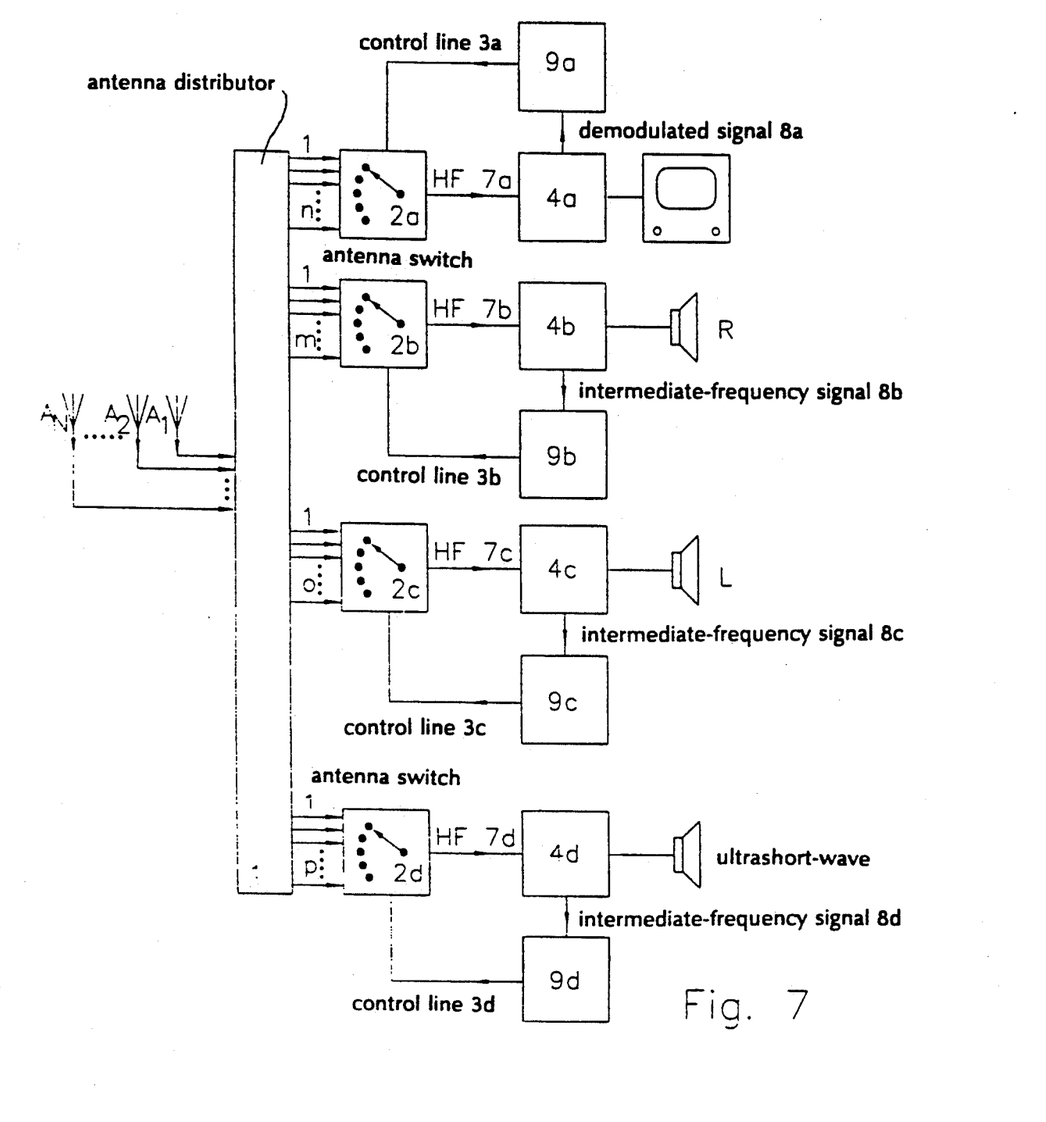
FIG. 7 shows an antenna diversity system for preventing reception interference in the reception of the stereo television sound and the television picture as well as of a ultrashort-wave radio channel.

Another advantage in the antenna diversity systems according to the invention consists in that, in addition to the possibility of television reception with stereo sound, it enables ultrashort-wave radio reception with the same set of antenna signals, e.g. in luxury limousines. A standard car radio can be used as a tuner 4d in this case (see FIG. 7). Here as well, the frequency-modulated intermediate-frequency signal 8d is examined in the diversity processor 9d for reception interference in a known manner and reception interference is prevented by rapidly switching to an undisturbed signal.

In a particularly advantageous embodiment of the invention, a plurality of FM tuners for frequency-modulated ultrashort-wave radio are connected to the respective antenna switches. In this way it is possible, e.g. in radio reception in busses, for the passenger to be offered a number of radio programs via headphones with individual selection of the program. Each program, by itself, is reproduced in such a way as to be as free from interference as possible in mobile reception by antenna diversity. The improvement in reception is effected in that a separate diversity processor, to which the intermediate frequency which is not yet limited is supplied, is available for every radio program and in that the reception interference is prevented in a manner known per se by switching to other signals at the antenna switch.

Figure 2:
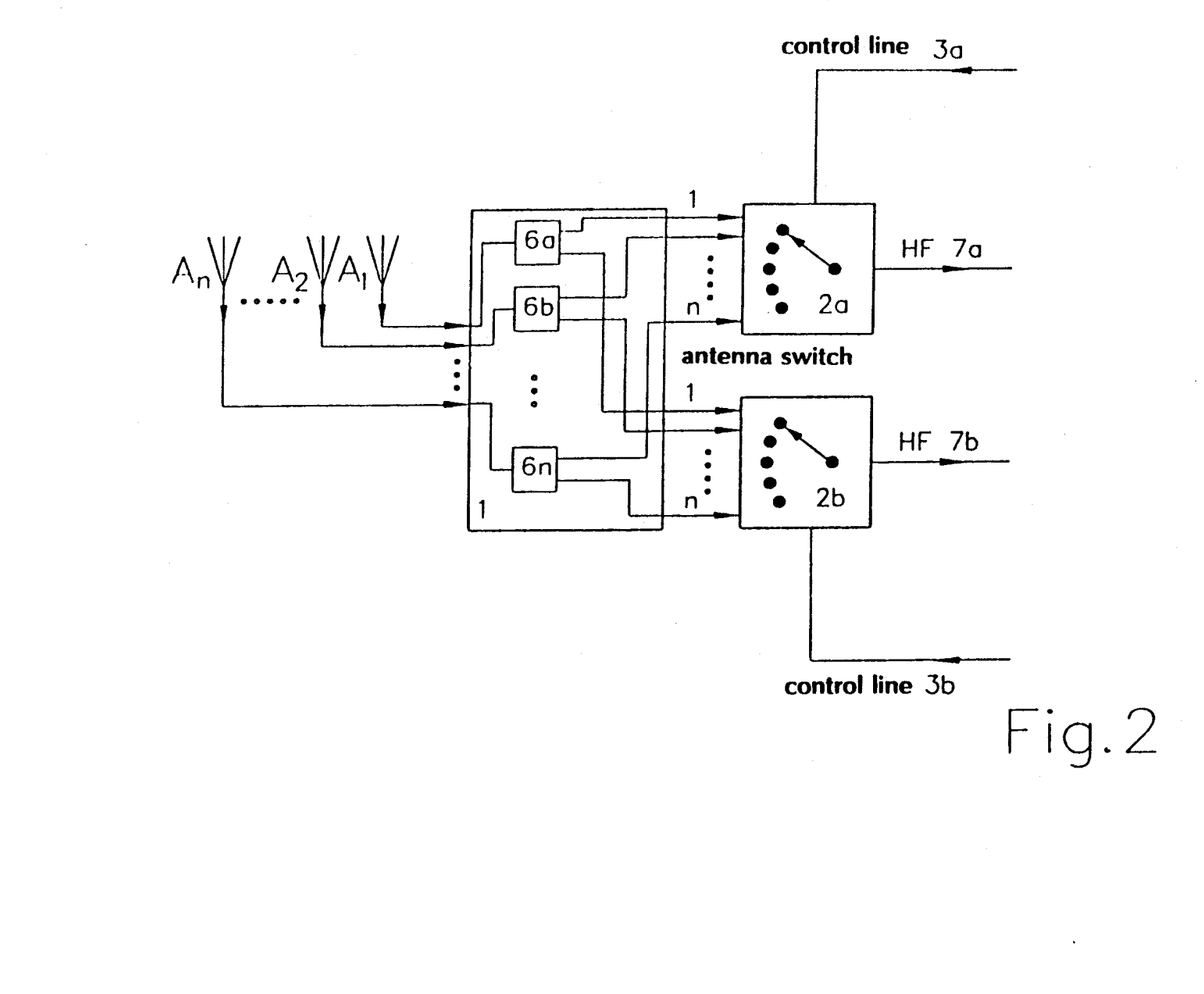
FIG. 2 shows an antenna distributor in an antenna diversity system according to FIG. 1 having passive networks.

In a particularly simple embodiment of the invention, the same number of antenna signals $A_1$ to $A_n$ which are supplied as input signals to the antenna distributor 1 are supplied to the antenna switches 2a and 2b in the antenna distributor 1 by passive networks 6a to 6n (see FIG. 2). The networks 6a to 6n have the task of dividing the antenna signals in output to two outputs as equally as possible and decoupling the respective two outputs from one another as well as possible so that the switching state of the antenna switch has a sufficiently low reaction on the other respective output. These requirements are met to a high degree e.g., by Wilkinson couplers which can be constructed according to the prior art so as to have a sufficiently broad band and have decoupling attenuations of more than 20 dB.

However, the construction of such a passive network for splitting signals with the absence of reaction is very complicated, takes up a great amount of space and is expensive to produce. Therefore, networks for splitting the signal are also available which enable a decoupling of the outputs by resistors, although greater signal output losses must be taken into account. The advantage in this consists in that, in addition to the simple and accordingly inexpensive implementation, the required band width can easily be covered at the same time. Such asymmetrical output dividers usually have decoupling values of 12 dB with simultaneous signal attenuation of 6 dB. But the resultant loss in sensitivity can frequently not be tolerated.

Figure 3:
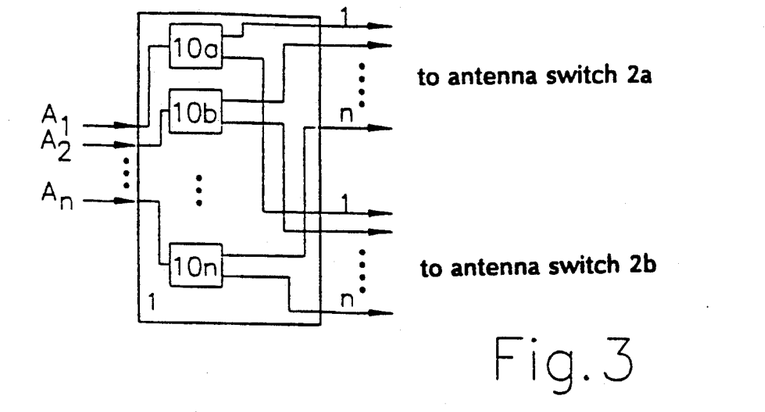
FIG. 3 shows an antenna distributor in an antenna diversity system according to FIG. 1 having active circuits.

In this respect, substantially more favorable ratios can be achieved when the signal splitting is effected in the antenna distributor 1 by active circuits 10a to 10n (see FIG. 3). Such highly linear and low-noise band width circuits have decoupling of more than 25 dB to 1 GHz according to the prior art. At the same time, these active networks allow an amplification of the signal to compensate for any signal attenuations, e.g. in the antenna switch. In addition, the active circuits can compensate for the signal loss, which necessarily occurs in passive output dividers, by internal amplification.

Figure 4:
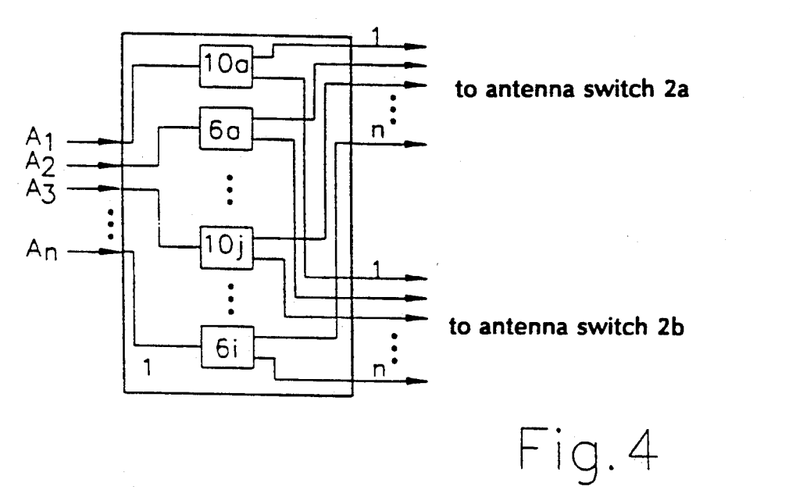
FIG. 4 shows an antenna distributor in an antenna diversity system according to FIG. 1 having active circuits and passive networks.

However, a combination of active and passive networks (see FIG. 4) is also possible for the antenna distributor 1 when, e.g., active and passive antennae are mounted at the vehicle. Thus, the passive antenna signals can then be supplied to the antenna switches via active signal distributors 10 to counteract further impairment of the signal which would result when splitting the signal by resistance networks. Meanwhile the signals of the active antennae which undergo an improvement in the signal-to-noise ratio and an amplification as a result of the noise-adapted amplifiers arranged in the base of the antenna can be distributed to the antenna switch in a cost-saving manner by passive networks 6.

Figure 5:
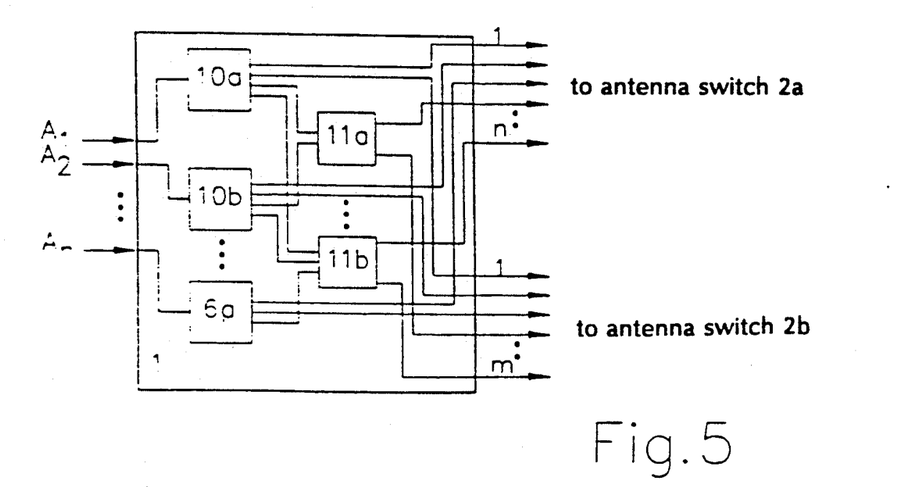
FIG. 5 shows an antenna distributor in an antenna diversity system according to FIG. 1 having active and passive networks for splitting the signals and networks for forming linear combinations.

Extensive investigations have shown that the sound and picture interference caused by multipath propagation in mobile reception in the VHF and UHF band can be further reduced when additional signals formed by linear combination of existing antenna signals are supplied to the antenna switches in addition to the antenna signals themselves. As shown in FIG. 5, the output signal y of a circuit 11 for forming a linear combination is determined by the following equation:

$$y = \sum_{i=1}^{n} a_i \cdot x_i,$$

where $x_i$ is the i-th input signal and $a_i$ is its complex linear coefficient by which this input signal is evaluated in the circuit 11. In order for the output signals of the linear combination circuits to be supplied to the antenna switches in addition to the antenna signals themselves, it is recommended that active signal distributors be used in the antenna distributor 1 for the antenna signals because of the greater flexibility associated with them, since these signals must also be supplied to the linear combination circuits. Passive signal distributors need only be resorted to in exceptional cases, especially when a greater signal attenuation is permissible. In principle, all available antenna signals can be used in the formation of the linear combinations. The linear coefficients, which are complex in the most general case, are predetermined according to magnitude and phase. The magnitude and the phase of the individual linear coefficients can be determined by test drives in which the efficiency is highest with respect to minimizing the reception interference.

Addition and subtraction from the input signals is a particularly simple form of linear combination. In this case, not all input signals need be used, rather, e.g., only particularly strong antenna signals can be made use of. This procedure corresponds to a case where the corresponding linear coefficients of the antenna signals which are not used are zero.

The number of signals offered to the antenna switches can vary in the interests of minimizing cost. This refers not only to the number of circuits for forming linear combinations but also to the number of antenna signals themselves.

Figure 8:
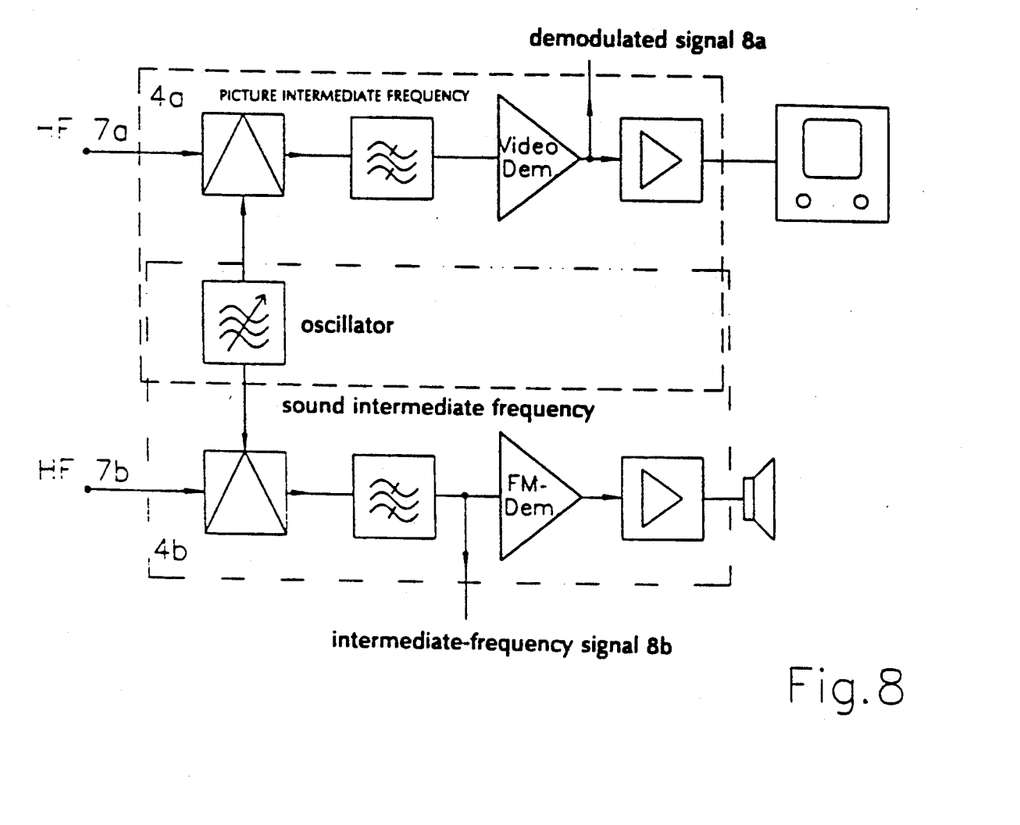
FIG. 8 shows the joint use of the oscillator signal of the picture tuner for the reception of the respective television sound of a television channel.

The use of the invention provides the additional advantage that the placement of cables in the vehicle is considerably simplified, since only the coaxial cable of the wide-band antennae installed in the vehicle need be guided to an antenna distributor to be arranged at a suitable location. The various tuners for different reception tasks are also advisably installed at the same installation location. The cost for the additional tuners is accordingly reduced because, as shown in FIG. 8, e.g. the picture oscillator of the picture tuner can also be used simultaneously as an oscillator for the television tuner when the signal evaluation is effected on the sound intermediate frequency of 33.4 MHz in the assigned diversity processor.

If this signal is converted, e.g., to 10.7 MHz, by another fixed oscillator, then this frequency-modulated television sound signal, for example, could be switched to the radio intermediate frequency of 10.7 MHz of a radio available for ultrashort-wave diversity reception and the sound reproduction device of this radio could also be used for the sound reproduction of the television sound. Accordingly, the diversity processor originally used only for ultrashort-wave diversity reception could also be used for diversity reception of the television sound. The control line leading from the diversity processor is then connected with the antenna switch for receiving the television sound. In the case of radio reception, this control line would be connected with the antenna switch for the reception of the ultrashort-wave radio. Technical costs are considerably reduced due to this double use of the radio and assigned diversity processor.

In television receivers for home reception, the television sound signal is usually first demodulated to the frequency of 5.5 MHz after demodulating the picture signal. Of course, in an antenna diversity system according to the invention the signal evaluation of the television sound can also be effected on this frequency in the diversity processor.

While the invention has been illustrated and described as embodied in an antenna diversity system with at least two antennae for mobile reception of VHF and UHF waves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in he appended claims:

1. An antenna diversity system for mobile reception of VHF and UHF waves comprising:
   a plurality of antennae arranged to receive antenna signals;
   an antenna distributor connected to the antennae to receive the antenna signals from the antennae and having a plurality of inputs and a plurality of sets of outputs, each of the antenna signals being fed to one of the inputs;
   a plurality of antenna switches having outputs, each of the antenna switches being connected to one of the sets of outputs of the antenna distributor;
   a plurality of tuners, each of the tuners connected to the outputs of one of the antenna switches and producing one of an intermediate-frequency signal and demodulated signal; and
   a plurality of diversity processors, each of the diversity processors being connected to one of the tuners to receive the signal therefrom and also to the antenna switch of the tuner connected thereto via a control line, and said diversity processors being structured to carry out a signal evaluation to control the antenna switch associated therewith to switch through a more favorable input signal to the tuner connected thereto.

2. An antenna diversity system according to claim 1, wherein the antenna distributor has two of the sets of outputs, and wherein one of said two sets of outputs is connected via one of the antenna switches with one of the tuners to receive a television picture signal of a television channel, while the other of said two sets of outputs is connected via another of the antenna switches with another of the tuners to receive a television sound signal of the television channel.

3. An antenna diversity system according to claim 2, wherein the tuner (4a) receiving the television picture signal produces a demodulated television picture signal (8a) and the tuner (4b) receiving the television sound signal produces an intermediate-frequency television sound signal (8b) not yet limited.

4. An antenna diversity system according to claim 1, wherein the antenna distributor (1) has three of said sets of outputs, and wherein one of the three sets is connected via a first one (2a) of the antenna switches with a first one (4a) of the tuners to receive a television picture signal of a television channel, while each of the other two of the three sets of outputs are connected via another of the antenna switches (2b and 2c) with another of the tuners (4b and 4c) to receive one of two television stereosound signals.

5. An antenna diversity system according to claim 1, wherein the antenna distributor (1 has three of said sets of outputs, and wherein one of the three sets is connected via a first one (2a) of the antenna switches with a first one (4a) of the tuners to receive a television picture signal of a television channel, while each of the other two of the three sets of outputs are connected via another of the antenna switches (2b and 2c) with another of the tuners (4b and 4c) to receive one of two television two-channel sound signals.

6. An antenna diversity system according to claim 2, wherein the antenna distributor (1) is provided with at least one additional set of said outputs connected via another (2d) of the antenna switches with another (4d) of the tuners for reception of frequency-modulated radio signals.

7. An antenna diversity system according to claim 2, further comprising means for producing an oscillator signal of the tuner receiving the television picture signal, said means for producing the oscillator signal also being associated with the tuner receiving the television sound signal so that the oscillator signal of the tuner receiving the television picture signal is the same as that of the tuner receiving the television picture signal.

8. An antenna diversity system according to claim 1, wherein at least two of the tuners are FM tuners and at least one of the FM tuners is structured to receive a frequency-modulate radio channel and at least one of the FM tuners is structured to receive a frequency-modulated television sound signal.

9. An antenna diversity system according to claim 8, wherein at least one of the FM tuners supplies one of the intermediate-frequency signals to one of the diversity processors.

10. An antenna diversity system according to claim 9, wherein the diversity processor processing the intermediate-frequency signal has means for testing for coincidence of amplitude break-ins and interference frequency deviation peaks of the intermediate-frequency signal to provide the signal evaluation.

11. An antenna diversity system according to claim 8, wherein the diversity processor has means for signal evaluation at standardized sound intermediate-frequencies including 33.4 MHz, 10.7 MHz and 5.5 MHz for evaluation of the frequency-modulated television sound signal.

12. An antenna diversity system according to claim 2, wherein the diversity processor (9a) connected to the tuner (4a) receiving the television picture signal is structure to perform the signal evaluation during a blanking time of the demodulated television picture signal, said blanking time being one of a horizontal and vertical blanking time.

13. An antenna diversity system according to claim 1, wherein the antenna distributor contains a plurality of passive networks (6a,6b, . . . , 6n) connected between the inputs and outputs of the antenna distributor for distributing the antenna signals to the antennas switches (2a,2b).

14. An antenna diversity system according to claim 1, wherein the antenna distributor contains a plurality of active networks (10a,10b, ..., 10n) connected between the inputs and outputs of the antenna distributor for distributing the antenna signals to the antennas switches (2a,2b).

15. An antenna diversity system according to claim 1, wherein the antenna distributor contains a plurality of active networks (10a,10b, ..., 10n) and a plurality of passive networks (6a,6b, ..., 6n), both said active and said passive networks acting to connect the inputs and outputs of the antenna distributor so that a portion of the antenna signals are distributed by the active networks and another portion are distributed by the passive networks.

16. An antenna diversity system according to claim 2, wherein the antenna distributor contains a plurality of circuit means for forming linear combinations of the antenna signals received from the antennae and the circuit means are connected to the antenna switches to feed output signals produced by the circuit means to the antenna switches in addition to the antenna signals from the antennae.

17. An antenna diversity system according to claim 16, wherein the coefficients of the linear combinations are determined according to magnitude and phase.

18. An antenna diversity system according to claim 17, wherein at least one of the coefficients is set equal to zero.

19. An antenna diversity system according to claim 16, wherein the number of antenna signals fed to the antenna switches varies according to the antenna switch.

20. An antenna diversity system according to claim 19, wherein the number of antenna signals fed to the antenna switches and the number of output signals from the circuit means varies.

* * * * *